United States Patent
Lee et al.

(10) Patent No.: US 11,467,910 B2
(45) Date of Patent: Oct. 11, 2022

(54) MEMORY SYSTEM RE-PERFORMING ACCESS OPERATION AND OPERATING METHOD THEREOF

(71) Applicant: SK hynix Inc., Gyeonggi-do (KR)

(72) Inventors: Hyung Min Lee, Gyeonggi-do (KR); Yong Il Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/034,444

(22) Filed: Sep. 28, 2020

(65) Prior Publication Data
US 2021/0026736 A1  Jan. 28, 2021

Related U.S. Application Data

(63) Continuation of application No. 16/026,550, filed on Jul. 3, 2018, now Pat. No. 10,817,377.

(30) Foreign Application Priority Data

Dec. 5, 2017  (KR) .......................... 10-2017-0165955

(51) Int. Cl.
*G06F 11/14* (2006.01)
*G06F 12/06* (2006.01)

(52) U.S. Cl.
CPC ...... *G06F 11/1415* (2013.01); *G06F 12/0646* (2013.01); *G06F 2201/805* (2013.01); *G06F 2201/86* (2013.01); *G06F 2212/1032* (2013.01)

(58) Field of Classification Search
CPC ............ G06F 11/1415; G06F 11/1413; G06F 11/1443
See application file for complete search history.

(56) References Cited

U.S. PATENT DOCUMENTS

| 10,261,914 B2* | 4/2019 | Troia ................... G06F 11/1004 |
| 2012/0120749 A1* | 5/2012 | Fujiwara ................ G11C 29/44 365/200 |

* cited by examiner

*Primary Examiner* — Nadeem Iqbal
(74) *Attorney, Agent, or Firm* — IP & T Group LLP

(57) ABSTRACT

A memory system includes a memory device; and a controller configured to transmit a target address to the memory device for performing an access operation, receive from the memory device a reference address at which the access operation has been performed, and selectively re-perform the access operation based on the reference address. The controller re-performs the access operation when the reference address is different from the target address.

15 Claims, 6 Drawing Sheets

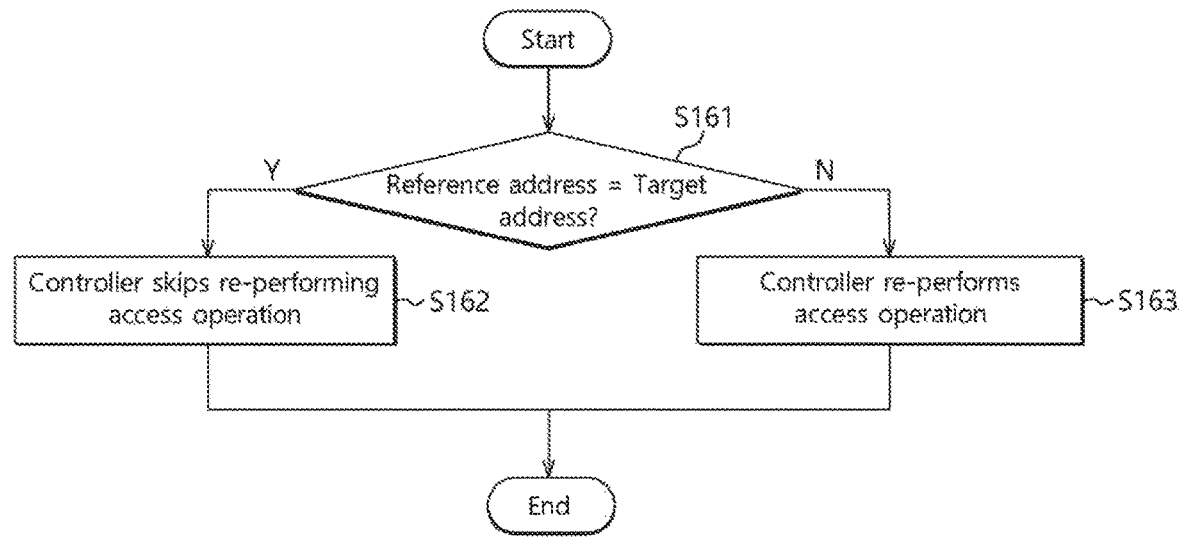
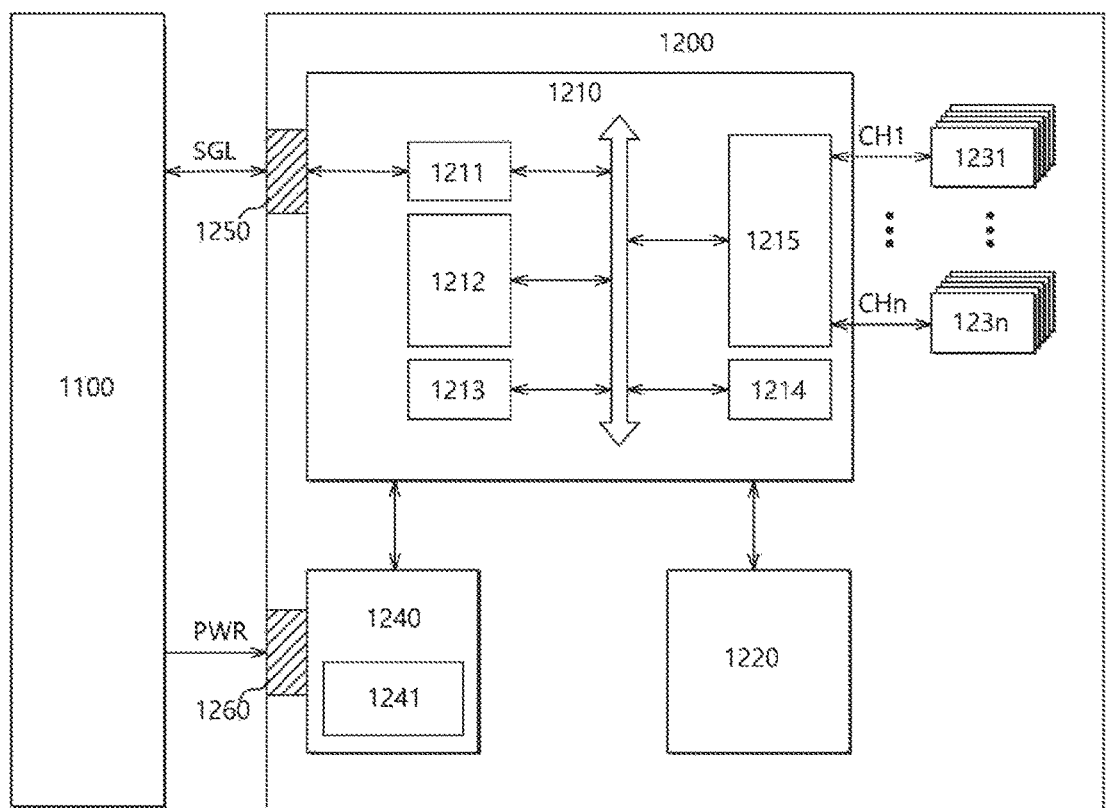

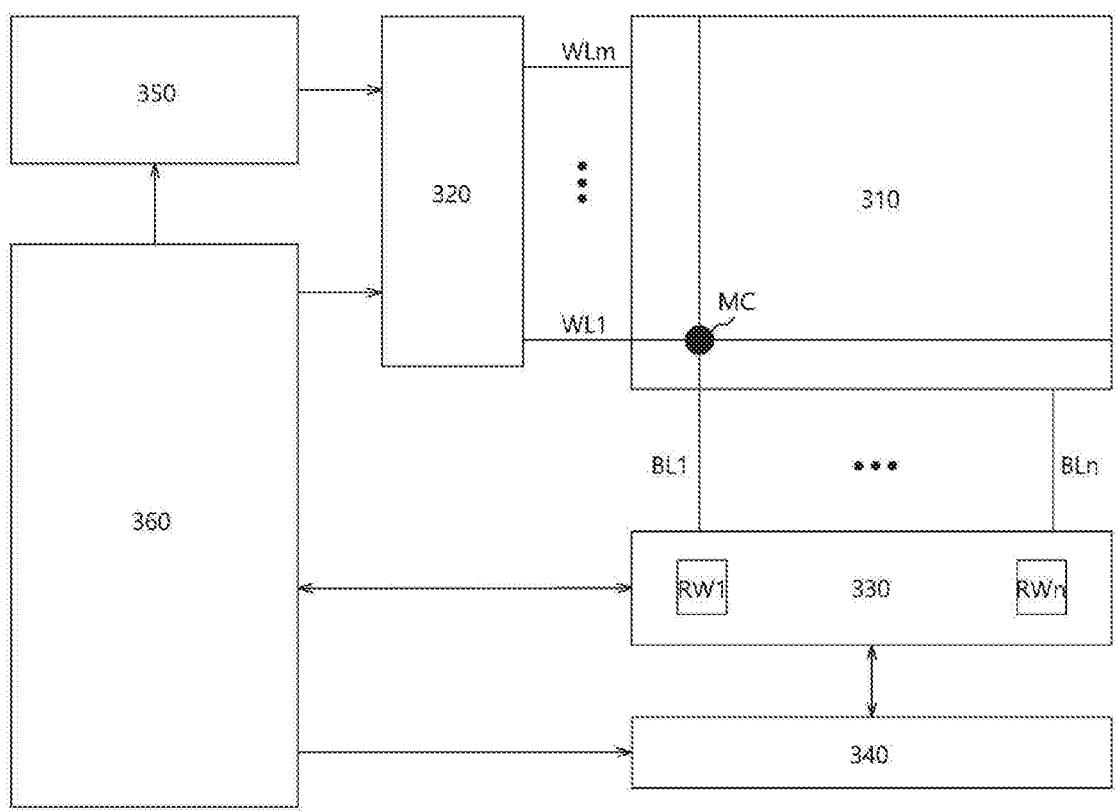

MEMORY SYSTEM RE-PERFORMING ACCESS OPERATION AND OPERATING METHOD THEREOF

CROSS-REFERENCES TO RELATED APPLICATION

This application is a continuation of U.S. patent application Ser. No. 16/026,550 filed on Jul. 3, 2018, which claims benefits of priority of Korean Patent Application No. 10-2017-0165955 filed on Dec. 5, 2017. The disclosure of each of the foregoing application is incorporated herein by reference in its entirety.

BACKGROUND

1. Technical Field

Various embodiments generally relate to a memory system and, more particularly, a memory system including a nonvolatile memory device.

2. Related Art

Memory systems store data provided by an external device in response to a write request. Memory systems may also provide stored data to an external device in response to a read request. Examples of external devices that use memory systems include computers, digital cameras, cellular phones and the like. Memory systems may be embedded in an external device during manufacturing of the external devices or may be fabricated separately and then connected afterwards to an external device.

SUMMARY

In an embodiment, a memory system may include: a memory device; and a controller configured to transmit a target address to the memory device for performing an access operation, receive from the memory device a reference address at which the access operation has been performed, and selectively re-perform the access operation based on the reference address. The controller may re-perform the access operation when the reference address is different from the target address.

In an embodiment, an operating method of a memory system may include: transmitting a target address to a memory device for performing an access operation; receiving a reference address at which the access operation has been performed, from the memory device; and selectively re-performing the access operation based on the reference address. The re-performing of the access operation may include re-performing the access operation when the reference address is different form the target address.

In an embodiment, the re-performing of the access operation includes skipping re-performing the access operation when the reference address is equal to the target address.

In an embodiment, the operating method of the memory system may further include commanding the memory device to transmit the reference address.

In an embodiment, the operating method of the memory system may further include receiving, by the memory device, the target address as the reference address.

In an embodiment, the operating method of the memory system may further include: further receiving access type information of the access operation from the memory device; and selectively re-performing the access operation based on the access type information.

In an embodiment, a memory system may include: a controller; and a memory device comprising a memory region, the memory device being configured to access the memory region and transmit access information to the controller, according to control of the controller. The controller may control the memory device to re-access the memory region based on the access information.

In an embodiment, a memory system may include: a memory device; and a controller for controlling the memory device to perform an operation by communicating an access command and a target address, wherein the controller controls the memory device to perform the operation again by providing the access command and the target address again when one or more of the access command and the target address are corrupted during the communicating step between the controller and the memory device.

BRIEF DESCRIPTION OF THE DRAWINGS

The above and other features and advantages of the present invention will become more apparent to those skilled in the art to which the present invention belongs by describing various embodiments thereof with reference to the attached drawings in which:

FIG. 3 is a flowchart of an operating method of the memory system shown in FIG. 1, in accordance with an embodiment of the present invention.

FIG. 4 is a simplified block diagram illustrating a data processing system including a solid-state drive (SSD), in accordance with an embodiment of the present invention.

FIG. 8 is a simplified block diagram illustrating a nonvolatile memory device included in a memory system, in accordance with an embodiment of the present invention.

DETAILED DESCRIPTION

Figure 1:
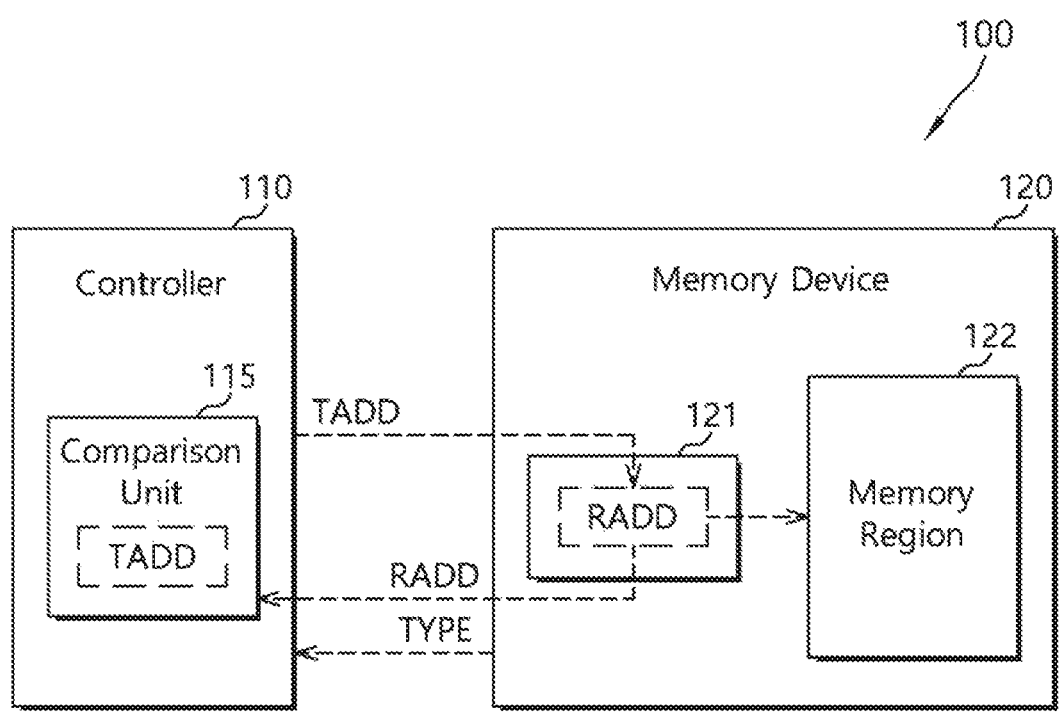
FIG. 1 is a simplified block diagram illustrating a memory system, in accordance with an embodiment of the present invention.

Hereinafter, a memory system and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a simplified block diagram illustrating a memory system 100, in accordance with an embodiment of the present invention.

The memory system 100 may be configured to store data provided from an external device, in response to a write request received from the external device. Furthermore, the memory system 100 may be configured to provide data stored therein to the external device, in response to a read request received from the external device.

The memory system 100 may be configured as one of various types including, for example, a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid-state Drive (SSD) and the like.

The memory system 100 may include a controller 110 and a memory device 120.

The controller 110 may control an operation of the memory system 100. The controller 110 may perform an access operation on the memory device 120 for processing a request received from the external device or perform an internal management operation of the memory system 100 regardless of a request received from the external device. An access operation may be at least one of a write operation, read operation and erase operation.

The controller 110 may detect errors which may occur in the communications between the controller 110 and the memory device 120 during an access operation to memory device 120. A serious error may result in providing an erroneous target address TADD to the memory device 120 for accessing a storage location in the memory device 120. In this case, the memory device 120 causes a serious error because the controller 110 accesses a storage location corresponding to the erroneous address, which is different from the intended target address TADD.

In accordance with an embodiment of the present invention, a memory system is provided which can detect such errors and correct them. More specifically, according to an embodiment, the controller 110 transmits the target address TADD to the memory device 120 for performing an access operation, and after the operation is performed, the controller receives from the memory device 120 a reference address RADD at which the access operation was actually performed. Then the controller 110 may selectively re-perform the access operation for the target address TADD based on the received reference address RADD.

Specifically, when the reference address RADD is different from the target address TADD, the controller 110 re-performs the access operation on the target address TADD. That is, when an error occurs during communication between the controller 110 and the memory device 120, the target address TADD may be corrupted into an unintended address and the corrupted address may be transmitted to the memory device 120 as the reference address RADD. In this case, the target address TADD or an intended address would be different from the reference address RADD or the unintended address. Hence, the controller 110 can detect the error by comparing the reference address RADD with the target address TADD, and re-performs the access operation on the target address TADD.

On the other hand, when the reference address RADD is equal to the target address TADD, the controller 110 does not re-perform the access operation on the target address TADD. That is, when the controller 110 determines that the access operation for the target address TADD was performed normally without an error during communication between the controller 110 and the memory device 120, then the controller does not re-perform the access operation.

The controller 110 may control the memory device 120 through various methods such that the memory device 120 transmits the reference address RADD to the controller 110. For example, the controller 110 may transmit a predetermined reference address transmission command to the memory device 120, for directing the memory device 120 to transmit the reference address RADD to the controller 110. For another example, the controller 110 may command the memory device 120 to transmit the reference address RADD to the controller 110, using existing commands used for controlling the memory device 120, for example, a command for acquiring a parameter stored in the memory device 120 and a command for checking the state of the memory device 120.

The controller 110 may include a comparison unit 115 for determining whether the reference address RAD is equal to or different from the target address TADD. The comparison unit 115 stores the target address TADD for comparing the target address TADD to the reference address RADD which is received from the memory device 120 after the access operation is performed in the memory device 120 in response to an access command and the corresponding target address TADD are transmitted to the memory device 120.

The controller 110 may transmit an access command corresponding to the access operation to the memory device 120. When a wrong access command is transmitted to the memory device 120 due to an error during the communication between the controller 110 and the memory device 120, the memory device 120 performs a different access operation from the intended access operation.

According to an embodiment, the controller 110 may receive type information TYPE of the access operation (access type information) from the memory device 120. The access type information TYPE may indicate whether the access operation performed by the memory device 120 is a read operation, write operation or erase operation.

The controller 110 may selectively re-perform the access operation based on the access type information TYPE transmitted from the memory device 120. Specifically, the controller 110 re-performs the access operation when the access type indicated by the access type information TYPE does not correspond to the corresponding access command transmitted to the memory device 120. However, the controller 110 does not re-perform the access operation when the access type indicated by the access type information TYPE corresponds to the access command transmitted to the memory device 120.

In another embodiment, the memory device 120 may transmit the reference address RADD and access type information TYPE at the same time according to control of the controller 110.

The memory device 120 may receive the target address TADD transmitted from the controller 110 as the reference address RADD, and access a storage location specified by the reference address RADD in the memory region 122. The memory device 120 may transmit to the controller 110 the reference address RADD at which the access operation was actually performed, according to control of the controller 110.

Furthermore, the memory device 120 may receive the access command transmitted from the controller 110, decide an access type according to the received access command, and perform an access operation. The memory device 120 may transmit access type information TYPE of the performed access operation to the controller 110, according to control of the controller 110.

The memory device 120 may include a register 121 and a memory region 122.

The register 121 may store the reference address RADD. The reference address RADD may be stored in the register 121 until the reference address RADD is transmitted to the controller 110, according to control of the controller 110.

The memory region 122 may include a plurality of memory cells for storing data. The memory region 122 may be accessed based on the reference address.

The memory device 120 may be any suitable memory device including, for example, a nonvolatile memory device 120 or volatile memory device 120. The nonvolatile memory device 120 may include a flash memory, such as a NAND flash or a NOR flash, a Ferroelectrics Random-access Memory (FeRAM), a Phase-Change Random-access Memory (PCRAM), a Magnetoresistive Random-access Memory (MRAM), a Resistive Random-Access Memory (ReRAM), and the like. The volatile memory device 120 may include a Dynamic Random-Access Memory (DRAM), a Synchronous Dynamic Random-Access Memory (SDRAM), a Static Random-Access Memory (SRAM), and the like.

FIG. 1 illustrates that the memory system 100 includes one memory device 120, but the number of memory devices included in the memory system 100 is not limited thereto.

Figure 2:
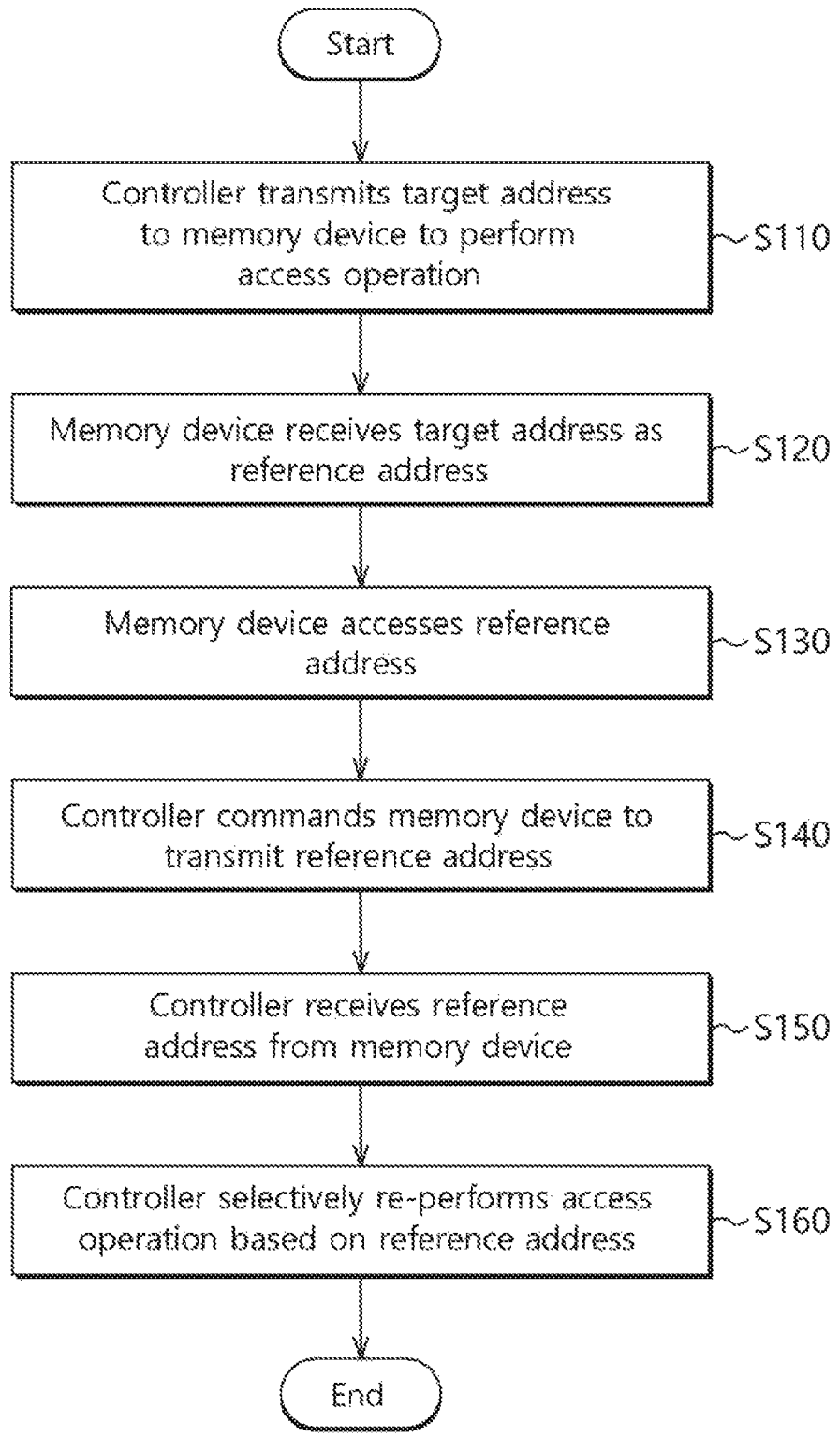
FIG. 2 is a flowchart of an operating method of the memory system shown in FIG. 1, in accordance with an embodiment of the present invention.

FIG. 2 is a flowchart of an operating method of the memory system 100 of FIG. 1, in accordance with an embodiment of the present invention.

Referring to FIG. 2, the operating method may start with step S110 in which the controller 110 transmits a target address TADD to the memory device 120 for performing an access operation on the target address TADD of the memory region 122. The controller 110 may transmit the target address TADD together with an access command to the memory device 120. The target address TADD may indicate a specific storage location in the memory region 122.

At step S120, the memory device 120 may receive the target address TADD as the reference address RADD. When an error occurs during the communication between the controller 110 and the memory device 120, the reference address RADD is different from the target address TADD due to a corruption of the target address TADD during the transmission of the target address TADD to the memory device 120.

At step S130, the memory device 120 may perform an access operation to the storage location of the reference address RADD in the memory region 122 in response to the provided access command.

At step S140, the controller 110 commands the memory device 120 to transmit the reference address RADD.

At step S150, the controller 110 receives the reference address RADD from the memory device 120.

At step S160, the controller 110 may selectively re-perform the access operation on the target address TADD based on the reference address RADD. When it is determined that an error occurred during communication between the controller 110 and the memory device 120, based on the reference address RADD, the controller 110 re-performs the access operation on the target address TADD.

FIG. 3 is a flowchart of an operating method of the memory system 100 of FIG. 1, in accordance with an embodiment of the present invention. The procedure of FIG. 3 may correspond to a specific embodiment of a step of FIG. 2.

At step S161, the controller 110 may determine whether the reference address RADD transmitted from the memory device 120 is equal to the target address TADD. When the reference address RADD is equal to the target address TADD, this means that an error did not occur during the communication between the controller 110 and the memory device 120, hence, the procedure proceeds to step S162. When the reference address RADD is not equal to the target address TADD means that an error occurred during the communication between the controller 110 and the memory device 120, hence, the procedure proceeds to step S163.

At step S162, the controller 110 skips re-performing the access operation on the target address TADD.

At step S163, the controller 110 re-performs the access operation on the target address TADD.

FIG. 4 is a simplified block diagram illustrating a data processing system 1000 including a solid-state drive (SSD) 1200 in accordance with an embodiment of the present invention. Referring to FIG. 4, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control an operation of the SSD 1200. The controller 1210 may include a host interface unit 1211, a control unit 1212, a random-access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random-access memory 1213 may be used as a working memory for driving such a firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 5:
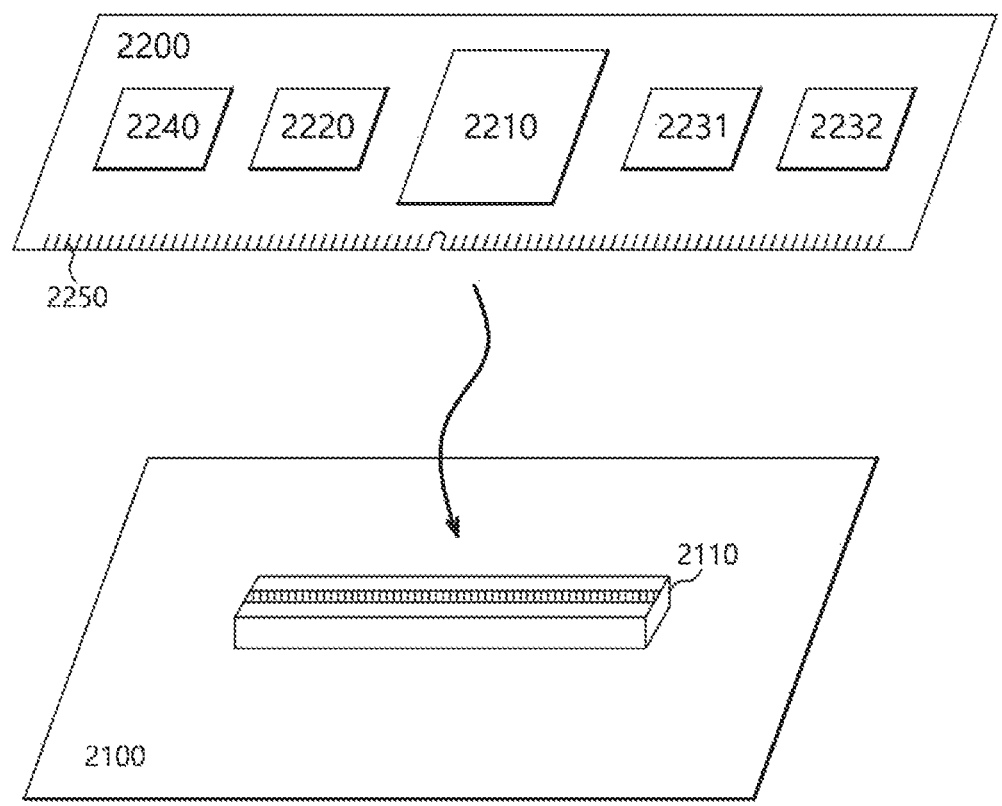
FIG. 5 is a simplified block diagram illustrating a data processing system including a memory system, in accordance with an embodiment of the present invention.

FIG. 5 is a simplified block diagram illustrating a data processing system 2000 including a memory system 2200 in accordance with an embodiment of the present invention. Referring to FIG. 5, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control an operation of the memory system 2200. The controller 2210 may be configured in the same manner as the controller 1210 shown in FIG. 4.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 6:
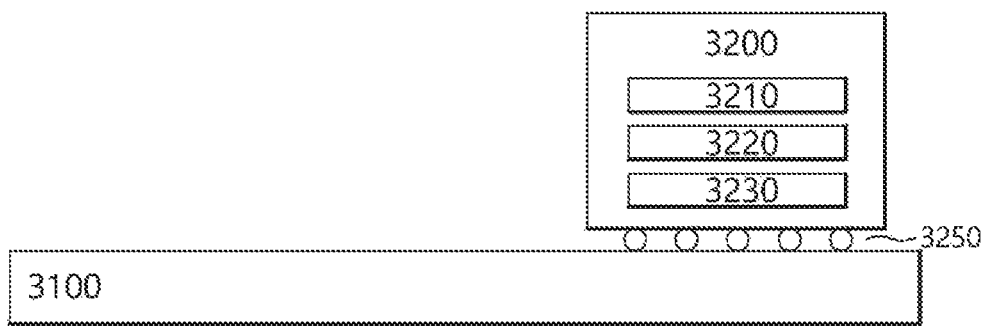
FIG. 6 is a simplified block diagram illustrating a data processing system including a memory system, in accordance with an embodiment of the present invention.

FIG. 6 is a simplified block diagram illustrating a data processing system 3000 including a memory system 3200 in accordance with an embodiment of the present invention. Referring to FIG. 6, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control an operation of the memory system 3200. The controller 3210 may be configured in the same manner as the controller 1210 shown in FIG. 4.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 7:
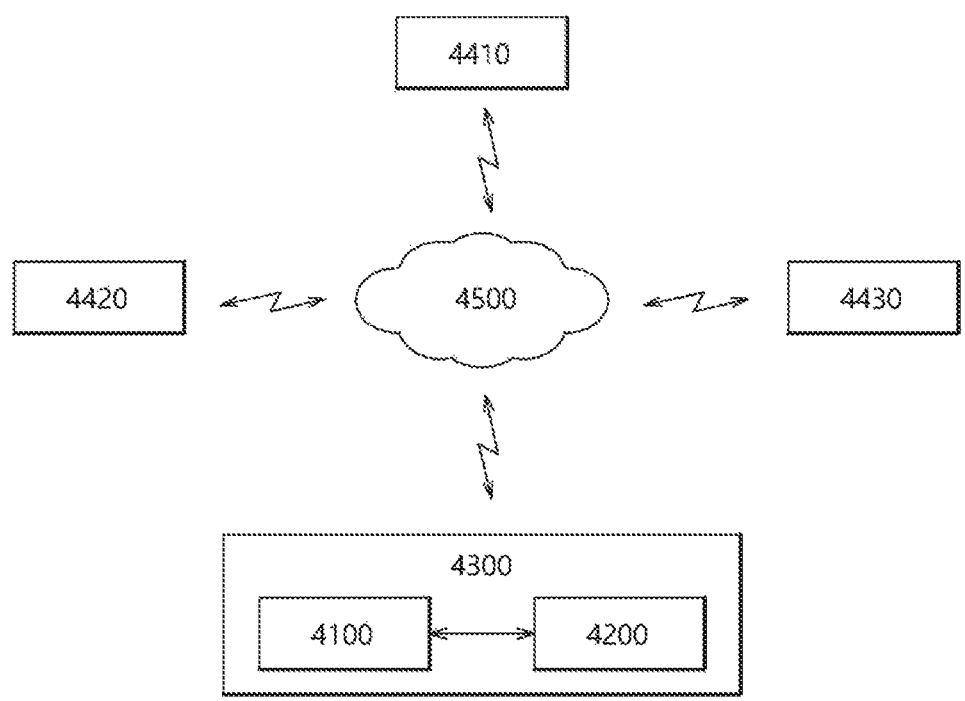
FIG. 7 is a simplified block diagram illustrating a network system including a memory system, in accordance with an embodiment of the present invention.

FIG. 7 is a simplified block diagram illustrating a network system 4000 including a memory system 4200 in accordance with an embodiment of the present invention. Referring to FIG. 7, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 4, the memory system 2200 shown in FIG. 5 or the memory system 3200 shown in FIG. 6.

FIG. 8 is a simplified block diagram illustrating a nonvolatile memory device 300 included in a memory system, in accordance with an embodiment of the present invention. Referring to FIG. 8, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control an operation of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it is will be understood to those skilled in the art that the embodiments described are examples only. Accordingly, the memory system described and the operating method thereof herein should not be limited based on the described embodiments.

What is claimed is:
1. A nonvolatile memory device comprising:
a memory region;
a control logic configured to perform an access operation on a reference address in the memory region and transmit the reference address at which the access operation has been performed to a controller, according to control of the controller; and
a register configured to store the reference address until the reference address is transmitted to the controller, wherein the register is separated from a location indicated by the reference address in the memory region.

2. The nonvolatile memory device of claim 1, wherein the control logic receives a target address transmitted from the controller as the reference address before performing the access operation.

3. The nonvolatile memory device of claim 1, wherein the control logic decides an access type based on an access command transmitted from the controller, performs the access operation based on a decided access type, and transmits access type information to the controller according to control of the controller.

4. The nonvolatile memory device of claim 3, wherein the access type information indicates whether the control logic has performed a read operation, write operation, or erase operation in response to the access command.

5. A memory system comprising:
a controller; and
a memory device comprising a memory region, the memory device being configured to perform a write operation on the memory region and transmit access information to the controller, according to control of the controller,
wherein the access information includes an address at which the write operation has been performed in the memory region, and
wherein the controller is configured to control the memory device to re-perform the write operation based on the access information.

6. The memory system of claim 5, wherein the controller transmits a write command and a target address for the write operation to the memory device, and
the memory device receives the target address as the address.

7. The memory system of claim 6, wherein the controller controls the memory device to re-perform the write operation, when the address included in the access information is different from the target address.

8. The memory system of claim 6, wherein the controller skips re-performing the write operation, when the address included in the access information is equal to the target address.

9. The memory system of claim 5, wherein the access information further includes an access type, and
the controller controls the memory device to re-perform the write operation based on the access type included in the access information.

10. A memory system comprising:
a memory device; and
a controller configured to transmit a target address to the memory device for performing an access operation, control the memory device to return a reference address at which the access operation has been performed, and detect an error by comparing the reference address with the target address,
wherein the controller is configured to re-perform the access operation based on a comparing result.

11. The memory system of claim 10, wherein the controller re-performs the access operation when the reference address is different from the target address.

12. The memory system of claim 10, wherein the controller skips re-performing the access operation when the reference address is equal to the target address.

13. The memory system of claim 10, wherein the memory device receives the target address as the reference address.

14. The memory system of claim 10, wherein the controller controls the memory device to return an access type after performing the access operation and selectively re-performs the access operation based on the access type.

15. The memory system of claim 14, wherein the access type indicates whether the memory device has performed a read operation, write operation, or erase operation.

* * * * *